No. 822,441. PATENTED JUNE 5, 1906.
T. S. FORBES.
BAYONET.
APPLICATION FILED APR. 3, 1905.
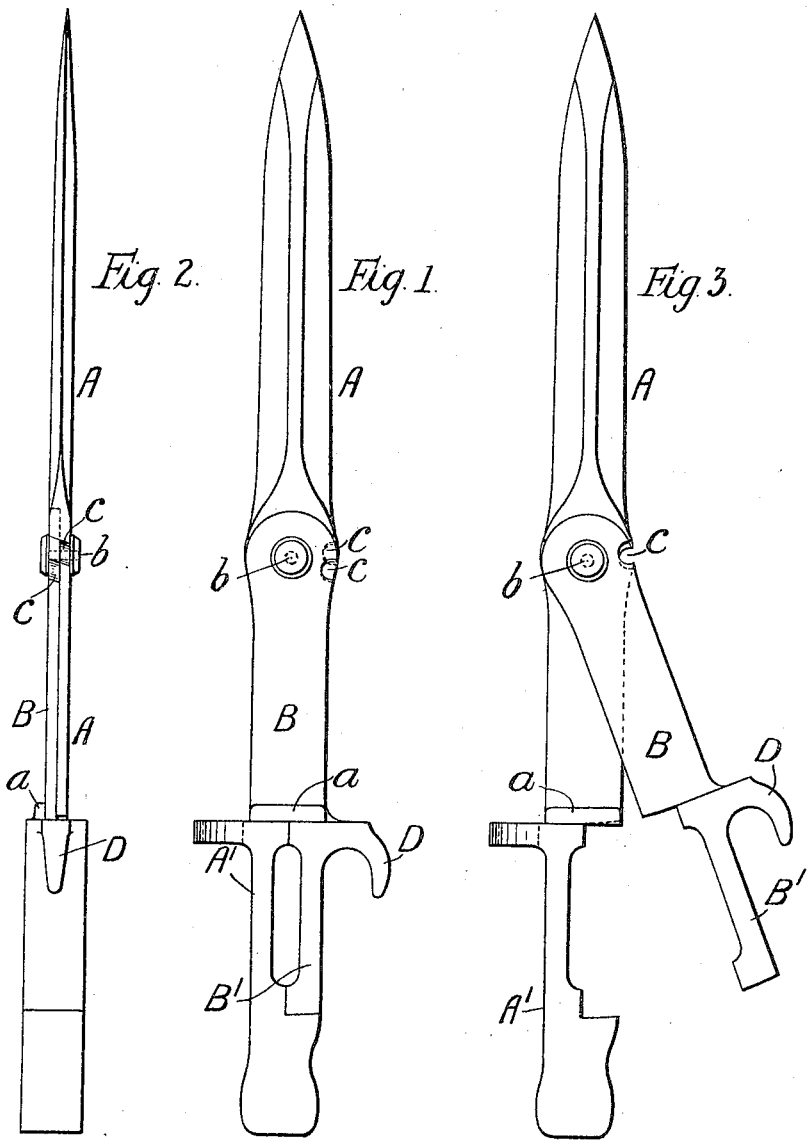

UNITED STATES PATENT OFFICE.

THOMAS STUART FORBES, OF GLASGOW, SCOTLAND.

BAYONET.

No. 822,441.

Specification of Letters Patent.

Patented June 5, 1906.

Application filed April 3, 1905. Serial No. 253,421.

*To all whom it may concern:*

Be it known that I, THOMAS STUART FORBES, a subject of the King of the United Kingdom of Great Britain and Ireland, residing at Glasgow, Scotland, have invented certain new and useful Improvements in Bayonets, of which the following is a specification.

This invention has for its object to adapt bayonets commonly employed for military purposes for use as cutting-pliers for severing and destroying barbed-wire entanglements as well as for use as gripping-pliers, thereby avoiding the necessity for providing troops with additional accouterments suitable for such purposes.

The invention is illustrated by the accompanying drawings, in which—

Figure 1 represents in elevation the improved bayonet with the shearing-blade closed; Fig. 2, a side elevation at right angles to Fig. 1, and Fig. 3 shows the bayonet with the shearing-blade opened up.

According to my invention and as shown by these drawings I secure upon the ordinary bayonet A, by means of a pivot-pin $b$, a steel or other blade B, having a cutting edge adapted to act in conjunction with the edge of the bayonet as a shear-blade for cutting purposes, a notch $c\ c$ being formed in each blade A and B, whereinto the wire to be cut is inserted, while the blades are opened up, as shown, in the position represented at Fig. 3 to bring the notches $c\ c$ into register.

The cutting is effected by pressure applied to bring the blades together to the position indicated at Fig. 1. The additional blade B is pivoted nearer the hilt A' than the point of the bayonet, and it extends rearward from the pivot-pin $b$ and terminates in a handle B' in such wise that such handle forms part of the handle of the bayonet.

A hook-like part D is formed on the handle portion of the blade B to facilitate opening up thereof, and a projection $a$ is formed on the blade A to guide the blade B in closing and hold it from rising.

Having now described my invention, what I claim, and desire to secure by Letters Patent of the United States, is—

1. A bayonet split throughout a portion of its body and handle to form two blades, said blades being pivotally united and having coöperating cutting-notches formed in their adjacent margins, said notches being so disposed with respect to each other that when the blades are opened, forming an incomplete bayonet, the notches register and occupy receiving positions for the material to be cut, said notches serving as cutting-pliers when the blades are being closed to form a complete bayonet.

2. The combination with a bayonet-blade having a notch in it of an auxiliary notched blade, pivoted thereto and a projection on the main blade to guide the pivoted blade in closing as set forth.

3. A bayonet having its handle split or divided longitudinally to form two blades pivoted together, each of said blades being provided with notches located so that when the blades are open the notches register to receive the material to be cut and when the blades are closed the notches are thrown out of register to cut the material, the handle of one blade being recessed and the handle of the companion blade fitting into said recess and forming a complete handle.

In testimony whereof I have signed my name to this specification in the presence of two subscribing witnesses.

THOMAS STUART FORBES.

Witnesses:
WALLACE FAIRWEATHER,
JNO. ARMSTRONG, Junr.